(12) United States Patent
Sudbeck et al.

(10) Patent No.: US 10,513,396 B1
(45) Date of Patent: Dec. 24, 2019

(54) TELESCOPING CONVEYOR DRIVE SYSTEM

(71) Applicant: MASABA, INC., Vermillion, SD (US)

(72) Inventors: Aaron Sudbeck, Hartington, NE (US); Robert Steffen, Hartington, NE (US)

(73) Assignee: Masaba, Inc., Vermillion, SD (US)

( * ) Notice: Subject to any disclaimer, the term of this patent is extended or adjusted under 35 U.S.C. 154(b) by 0 days.

(21) Appl. No.: 16/207,382

(22) Filed: Dec. 3, 2018

(51) Int. Cl.
  *B65G 15/26* (2006.01)
  *B65G 21/14* (2006.01)

(52) U.S. Cl.
  CPC .................... *B65G 21/14* (2013.01)

(58) Field of Classification Search
  None
  See application file for complete search history.

(56) References Cited

U.S. PATENT DOCUMENTS

| | | | |
|---|---|---|---|
| 7,448,486 B1 * | 11/2008 | Frankl | B65G 15/26 198/313 |
| 7,784,597 B2 * | 8/2010 | Frankl | B65G 41/002 198/313 |
| 9,315,328 B2 * | 4/2016 | Baek, IV | B65G 21/14 |
| 9,409,714 B2 * | 8/2016 | Dibble | B65G 67/606 |
| 2003/0029694 A1 * | 2/2003 | Gilmore | B65G 21/14 198/313 |

* cited by examiner

*Primary Examiner* — Kavel Singh
(74) *Attorney, Agent, or Firm* — Jeffrey A. Proehl; Woods, Fuller, Shultz & Smith, PC

(57) ABSTRACT

An extendable conveyor system with stationary and movable conveyor sections and a telescoping conveyor drive apparatus, and including a movement assembly configured to move the movable conveyor section with respect to the stationary conveyor section. The movement assembly may include teeth on one conveyor section and a teeth engaging apparatus on another conveyor section to move the movable conveyor section with respect to the stationary conveyor section. The teeth engaging apparatus may include a pin gear mounted on the second conveyor section and which has a plurality of pins positioned at radially spaced locations. A drive system may rotate the pin gear to thereby move the plurality of teeth and the first conveyor section in the longitudinal direction.

17 Claims, 13 Drawing Sheets

TELESCOPING CONVEYOR DRIVE SYSTEM

BACKGROUND

Field

The present disclosure relates to extendable conveyor systems and more particularly pertains to a new telescoping conveyor support and drive system for extending and retracting the movable portion of an extendable conveyor system with respect to the stationary portion of the conveyor system.

SUMMARY

In one aspect, the present disclosure relates to an extendable conveyor system which may comprise a stationary conveyor section and a movable conveyor section, with each section having a longitudinal direction and a lateral direction oriented substantially perpendicular to the longitudinal direction. The conveyor sections may have a conveyor belt, and the movable conveyor section may be extendable and retractable with respect to the stationary conveyor section. The system may also include a telescoping conveyor drive apparatus which may comprise a movement assembly configured to move the movable conveyor section with respect to the stationary conveyor section in the longitudinal direction of the conveyor sections. The movement assembly may include a plurality of teeth mounted on a first one of the conveyor sections, with the plurality of teeth including at least one array of teeth being arranged in a linear arrangement along a portion of the length of the movable conveyor section. The movement assembly may also include a teeth engaging apparatus mounted on a second one of the conveyor sections and being configured to engage and move the plurality of teeth on the first conveyor section to move the movable conveyor section with respect to the stationary conveyor section. The teeth engaging apparatus may include a pin gear mounted on the second conveyor section to rotate about a rotation axis. The pin gear may include a plurality of pins positioned at radially spaced locations from the axis of rotation and being arranged at circumferentially spaced positions about the axis of rotation. The plurality of pins may be oriented substantially parallel to the axis of rotation. The drive assembly may also include a drive system configured to rotate the pin gear to thereby move the plurality of teeth and the first conveyor section in the longitudinal direction.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
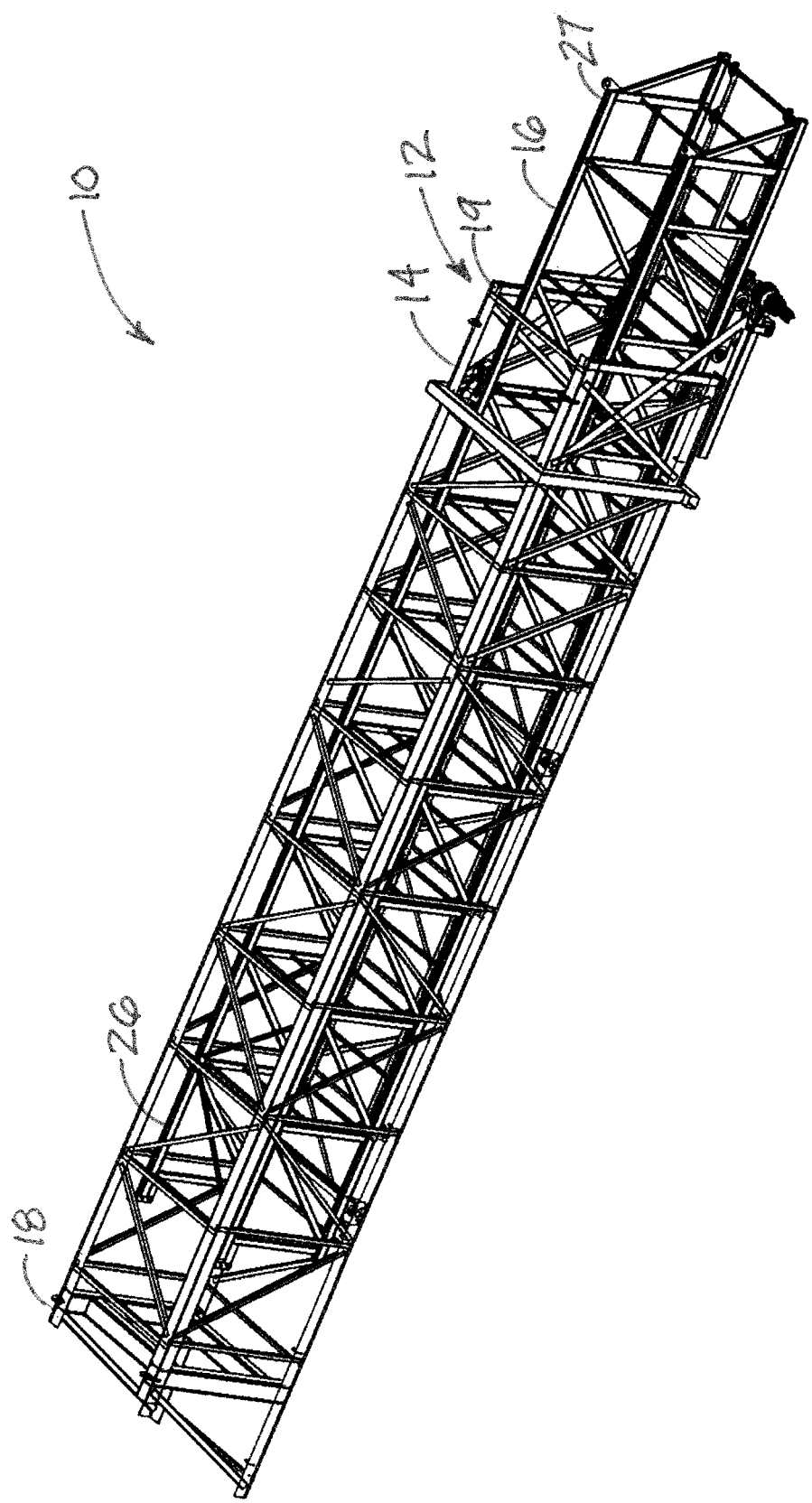
FIG. 1 is a schematic perspective view of an extendable conveyor apparatus with a new telescoping conveyor support and drive system shown in a retracted condition according to the present disclosure.
Figure 2:
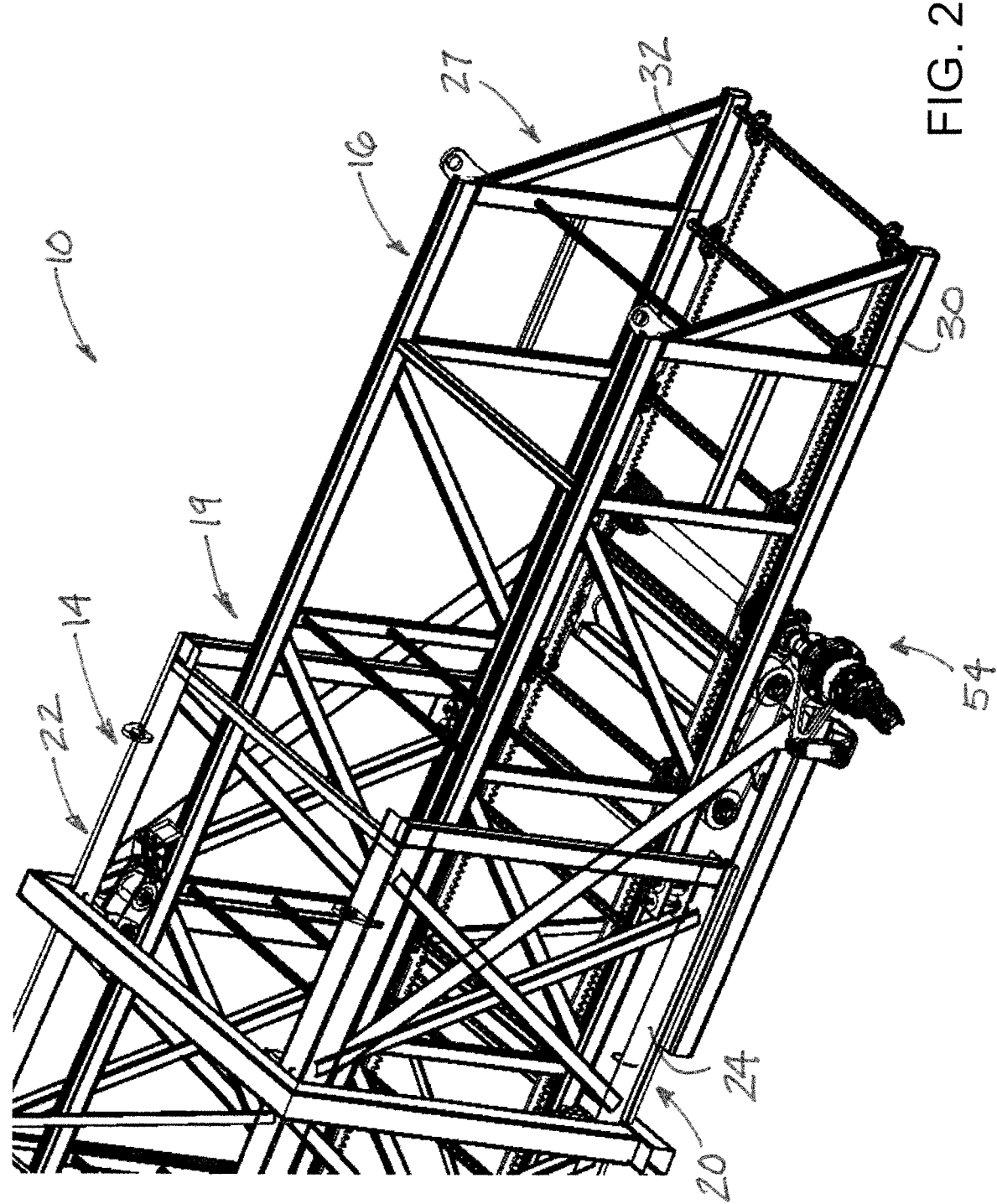
FIG. 2 is a schematic perspective view of the end portions of the conveyor sections of the conveyor apparatus incorporating the conveyor support and drive system, according to an illustrative embodiment.
Figure 3:
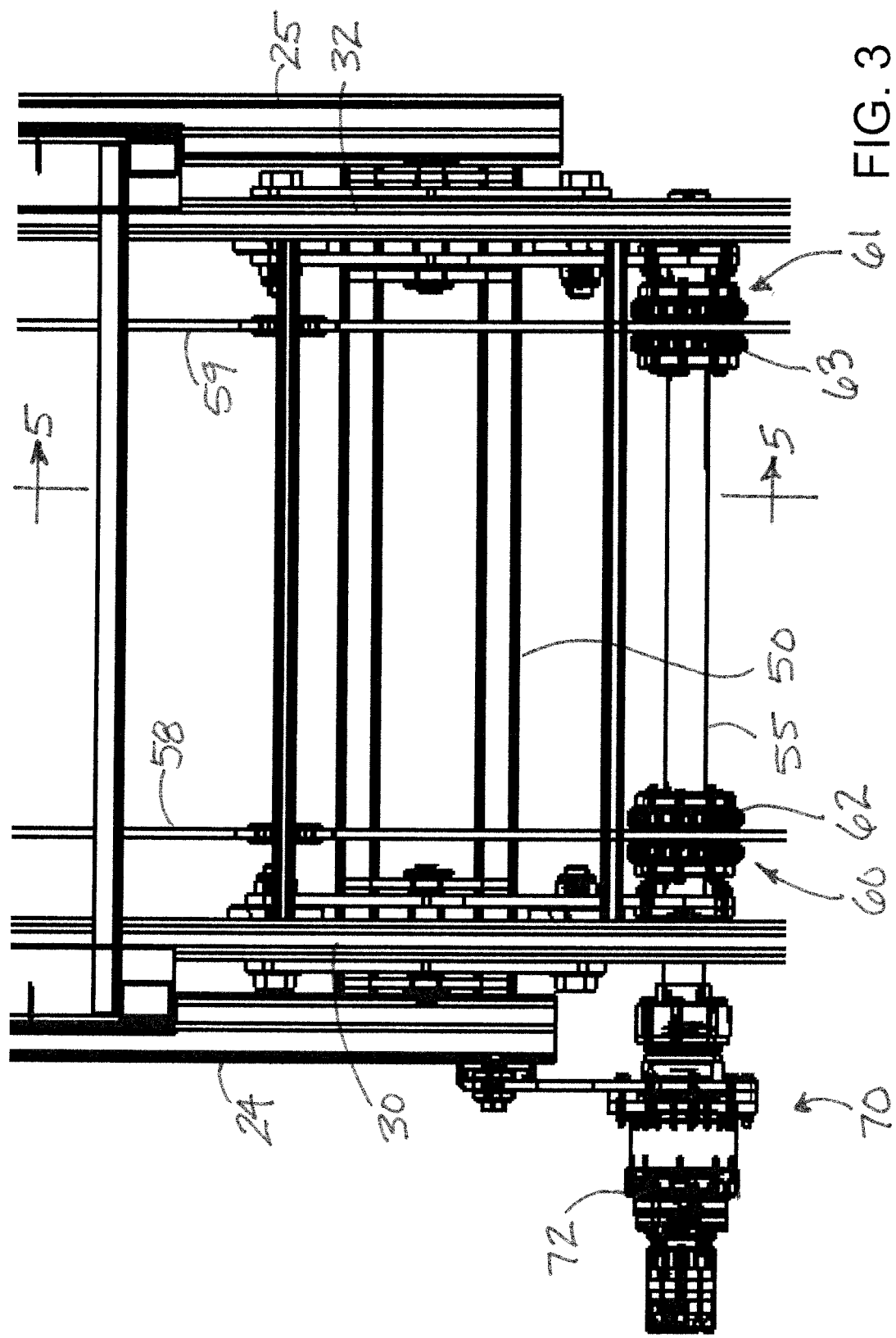
FIG. 3 is a schematic top view of the end portions of the conveyor sections of the conveyor apparatus, according to an illustrative embodiment.
Figure 4A:
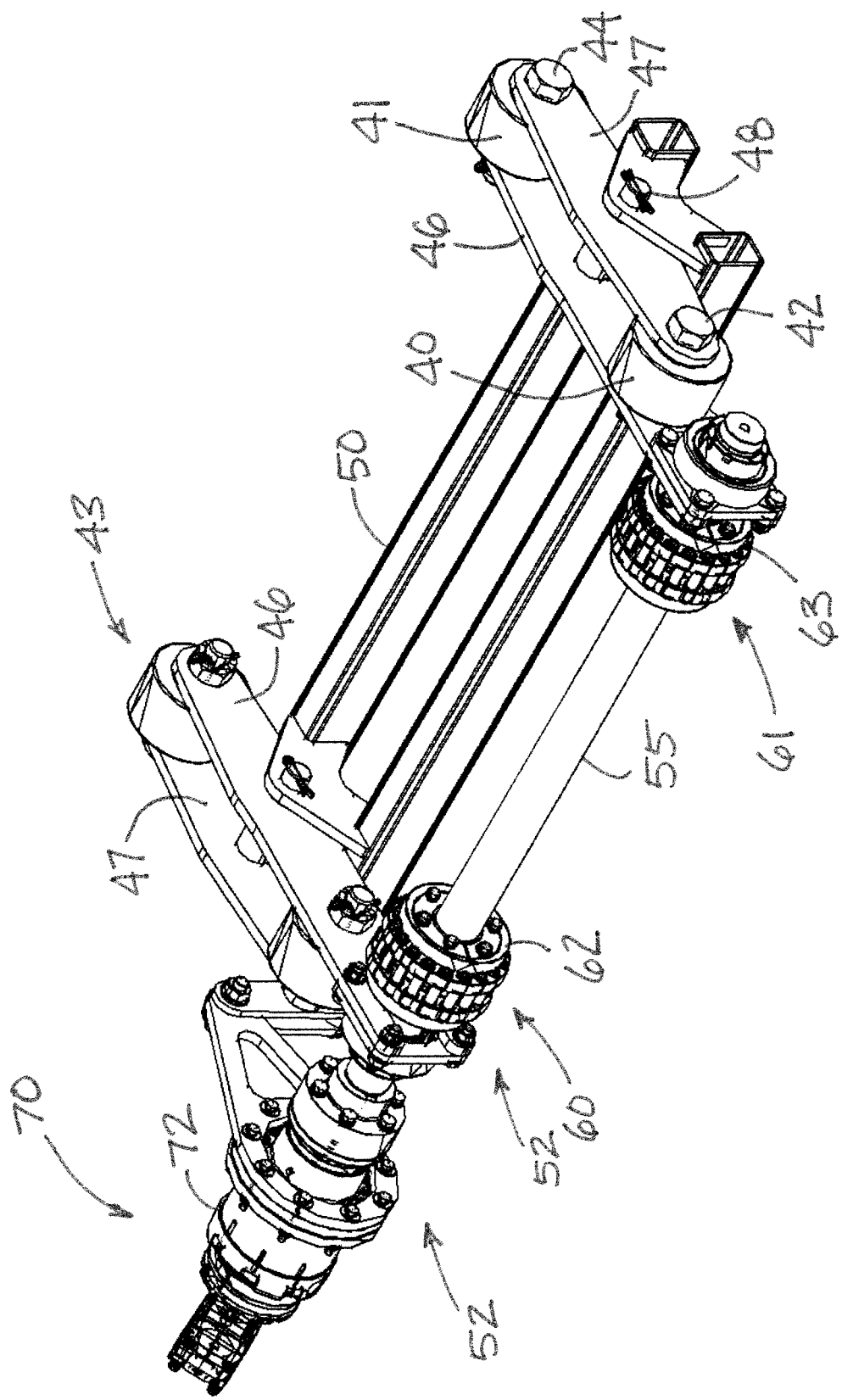
FIG. 4A is a schematic perspective view of an isolated portion of the conveyor support and drive system, according to an illustrative embodiment.
Figure 4B:
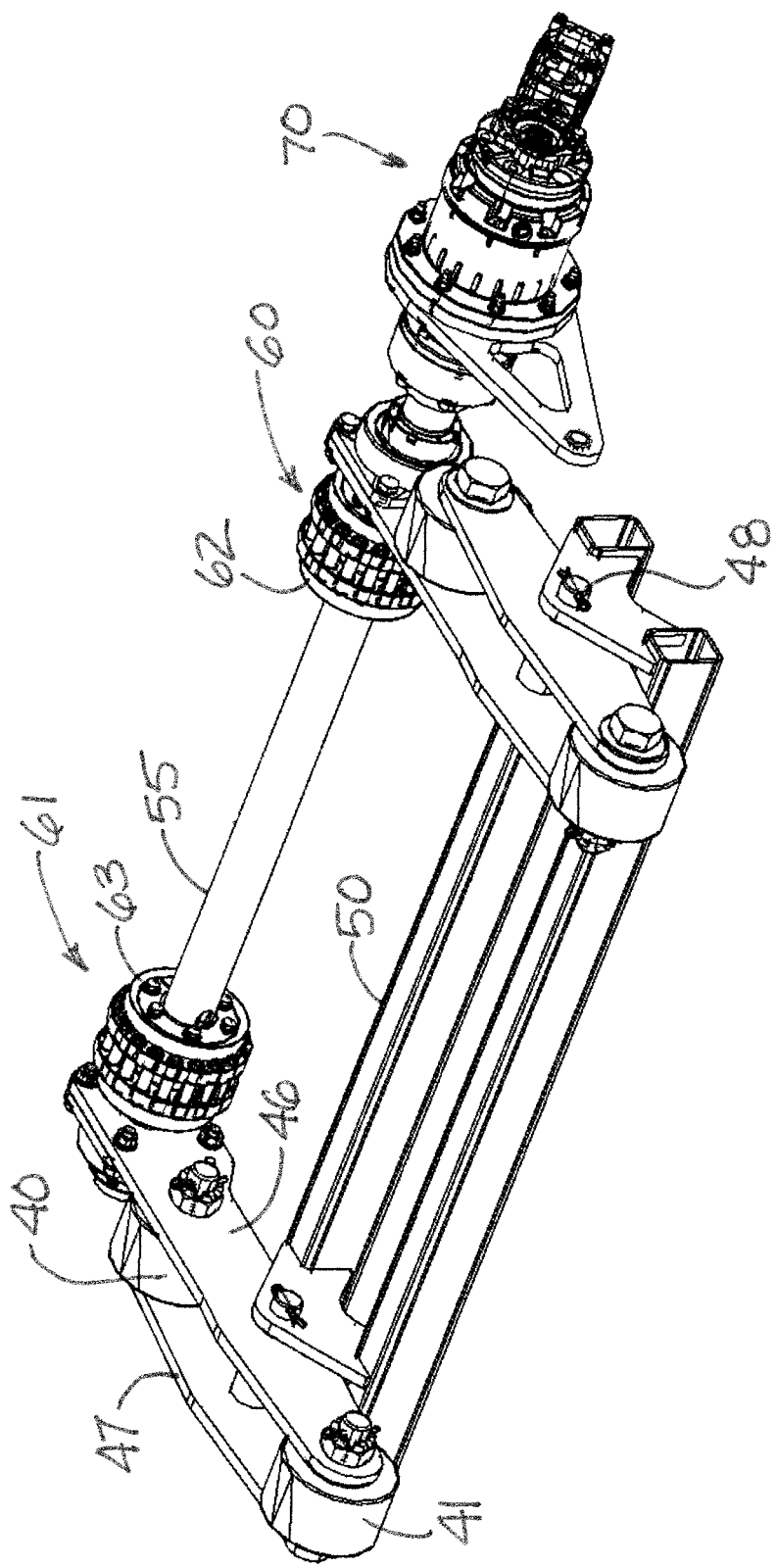
FIG. 4B is a schematic perspective view of the isolated portion of the conveyor support and drive system shown in FIG. 4A from a different perspective, according to an illustrative embodiment.
Figure 5:
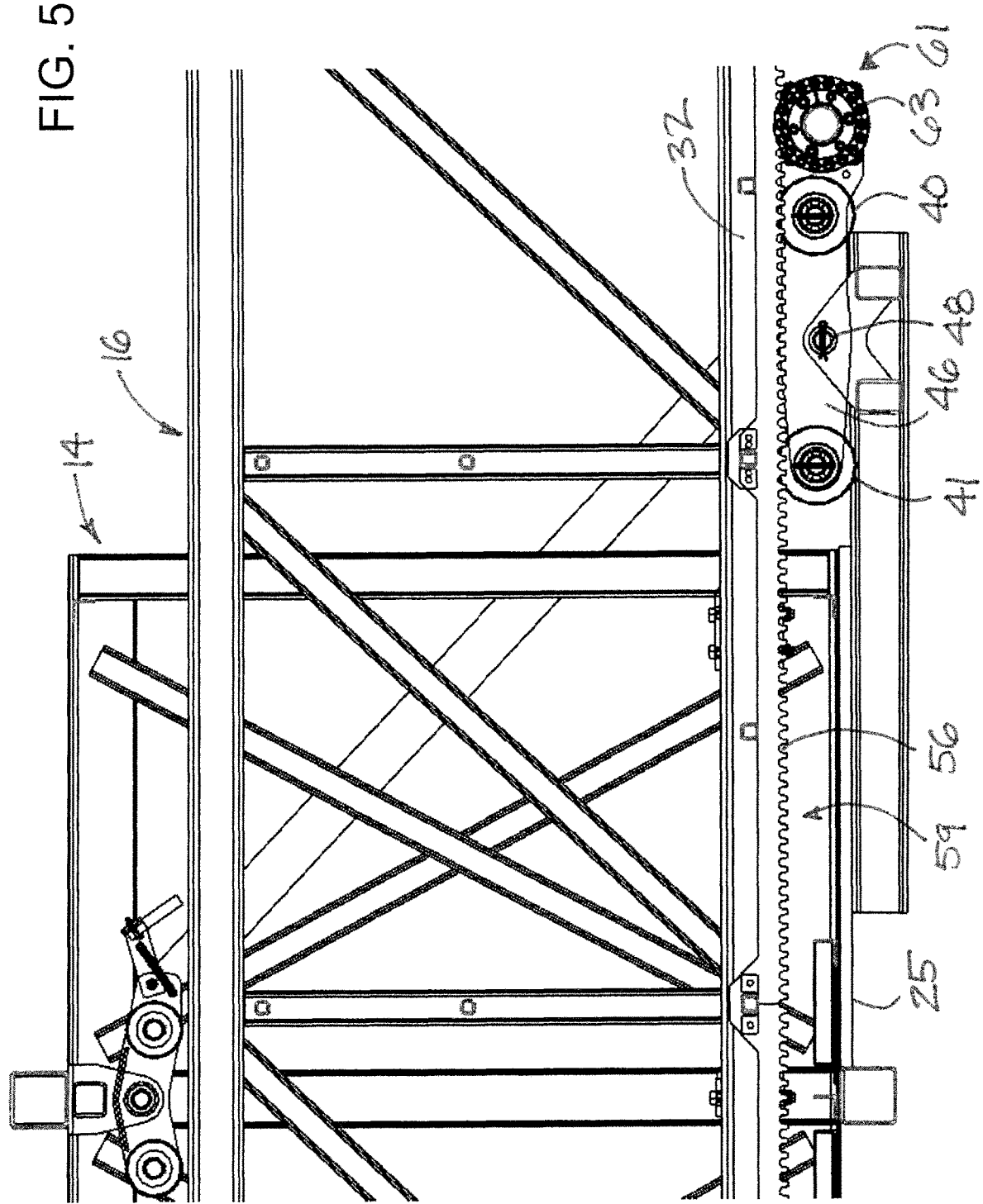
FIG. 5 is a schematic side sectional view of the end portions of the conveyor sections of the conveyor apparatus taken along line 5-5 of FIG. 3, according to an illustrative embodiment.
Figure 6:
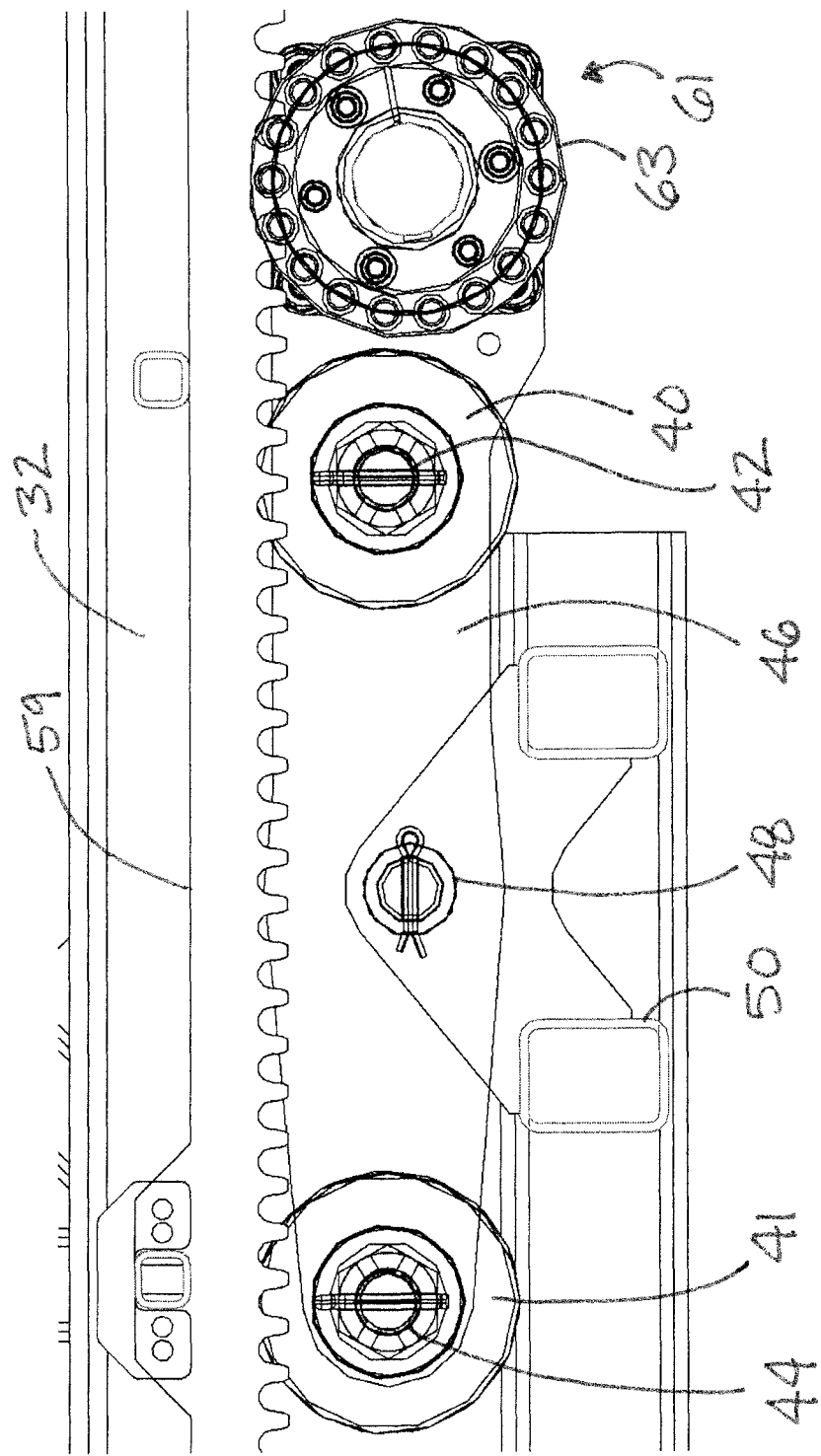
FIG. 6 is a schematic enlarged side sectional view of an isolated portion of the conveyor drive system, according to an illustrative embodiment.
Figure 7:
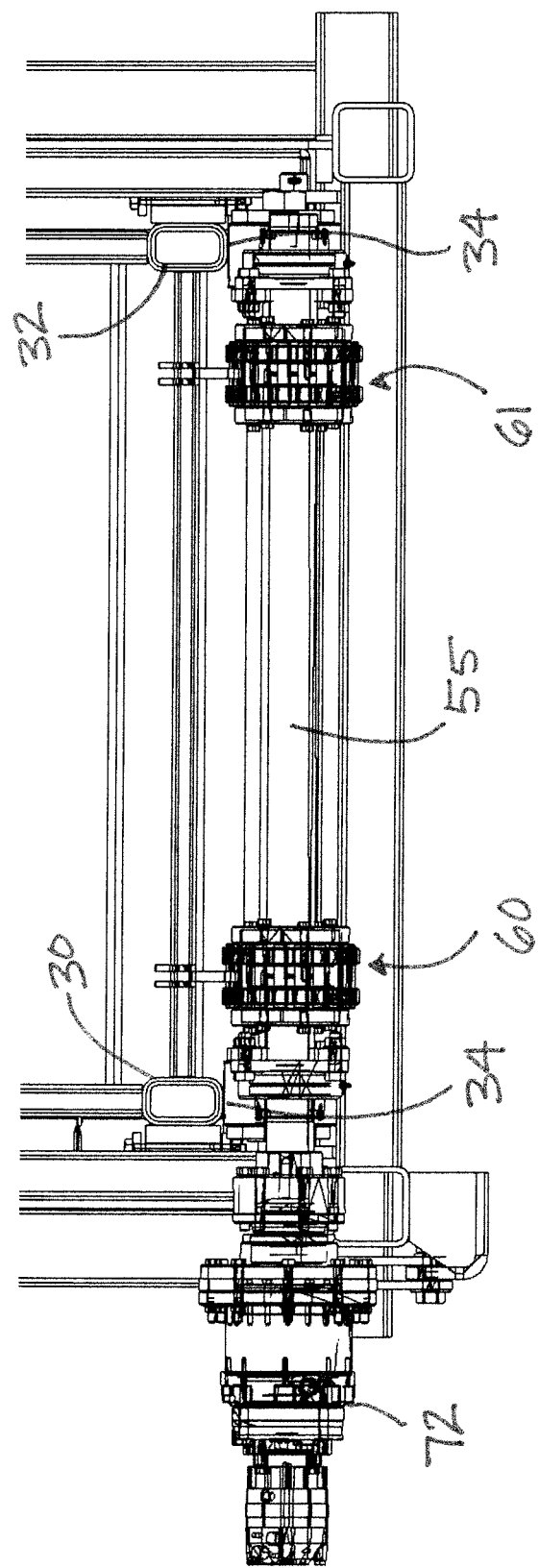
FIG. 7 is a schematic end view of the conveyor support and drive system and portions of the conveyor sections, according to an illustrative embodiment.
Figure 8:
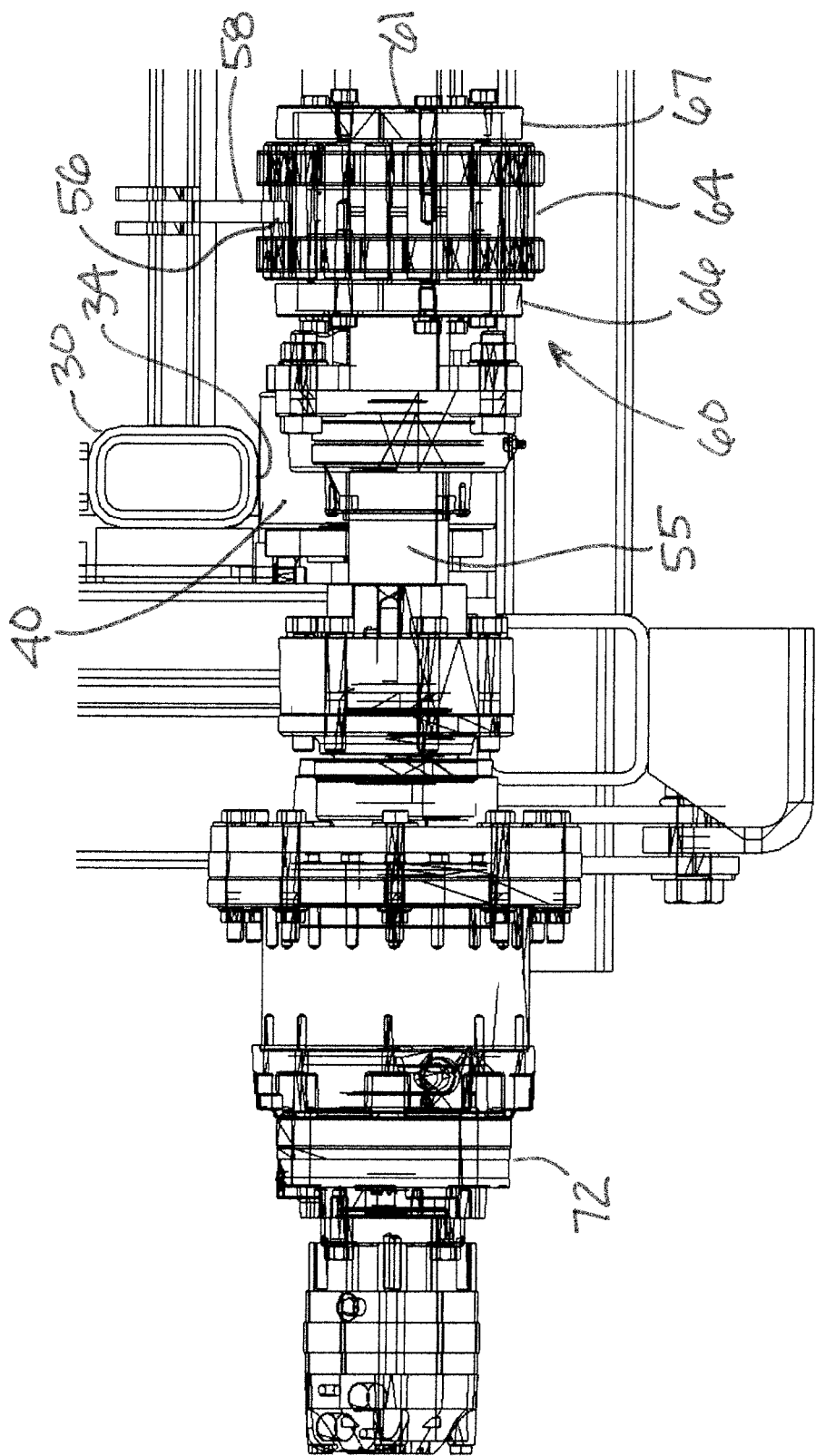
FIG. 8 is a schematic end view of a portion of the elements of the system shown in FIG. 7, according to an illustrative embodiment.
Figure 9:
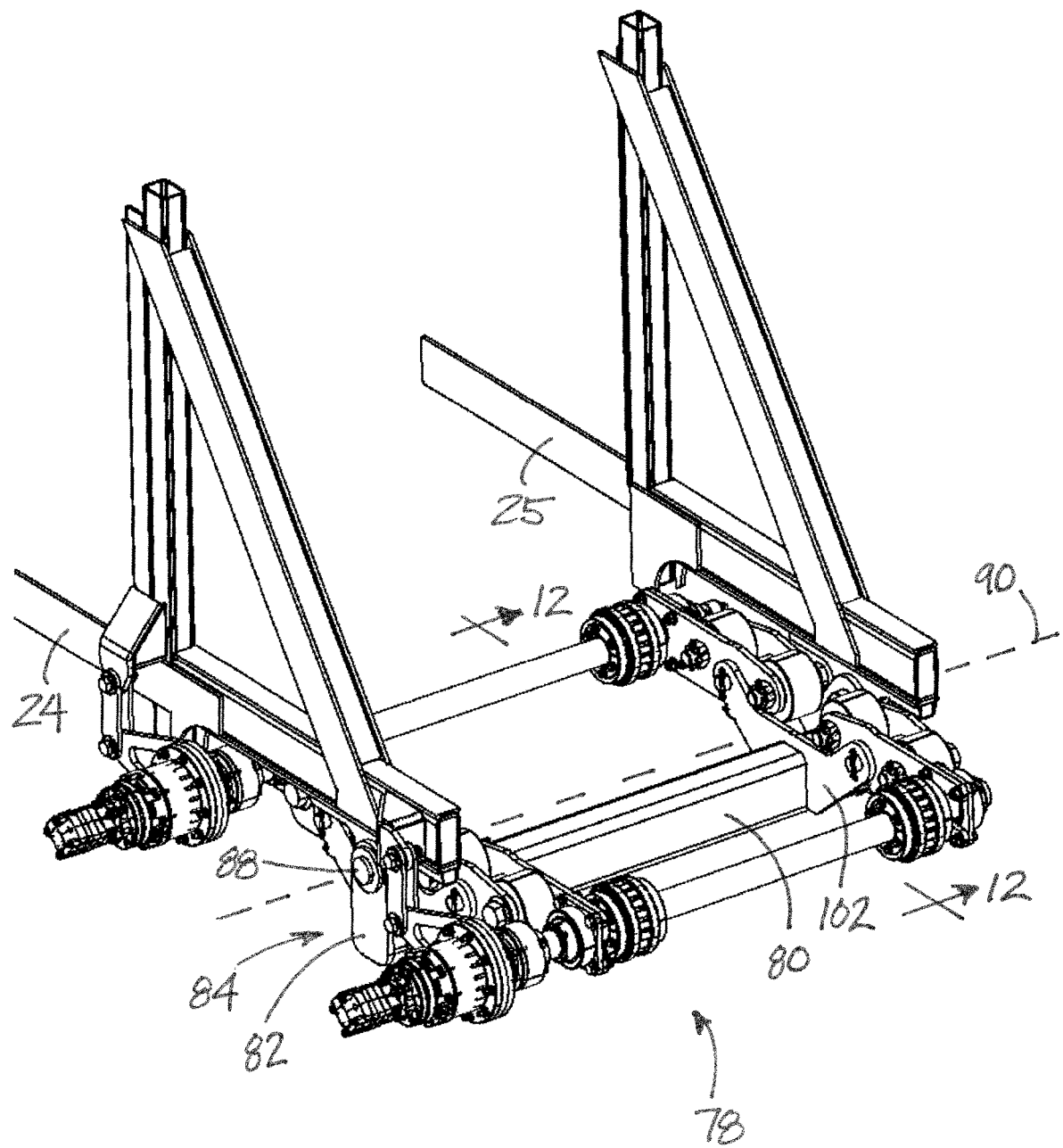
FIG. 9 is a schematic perspective view of a portion of the system including an optional configuration of the telescoping conveyor support and drive apparatus utilizing multiple support and drive structures, according to an illustrative embodiment.
Figure 10:
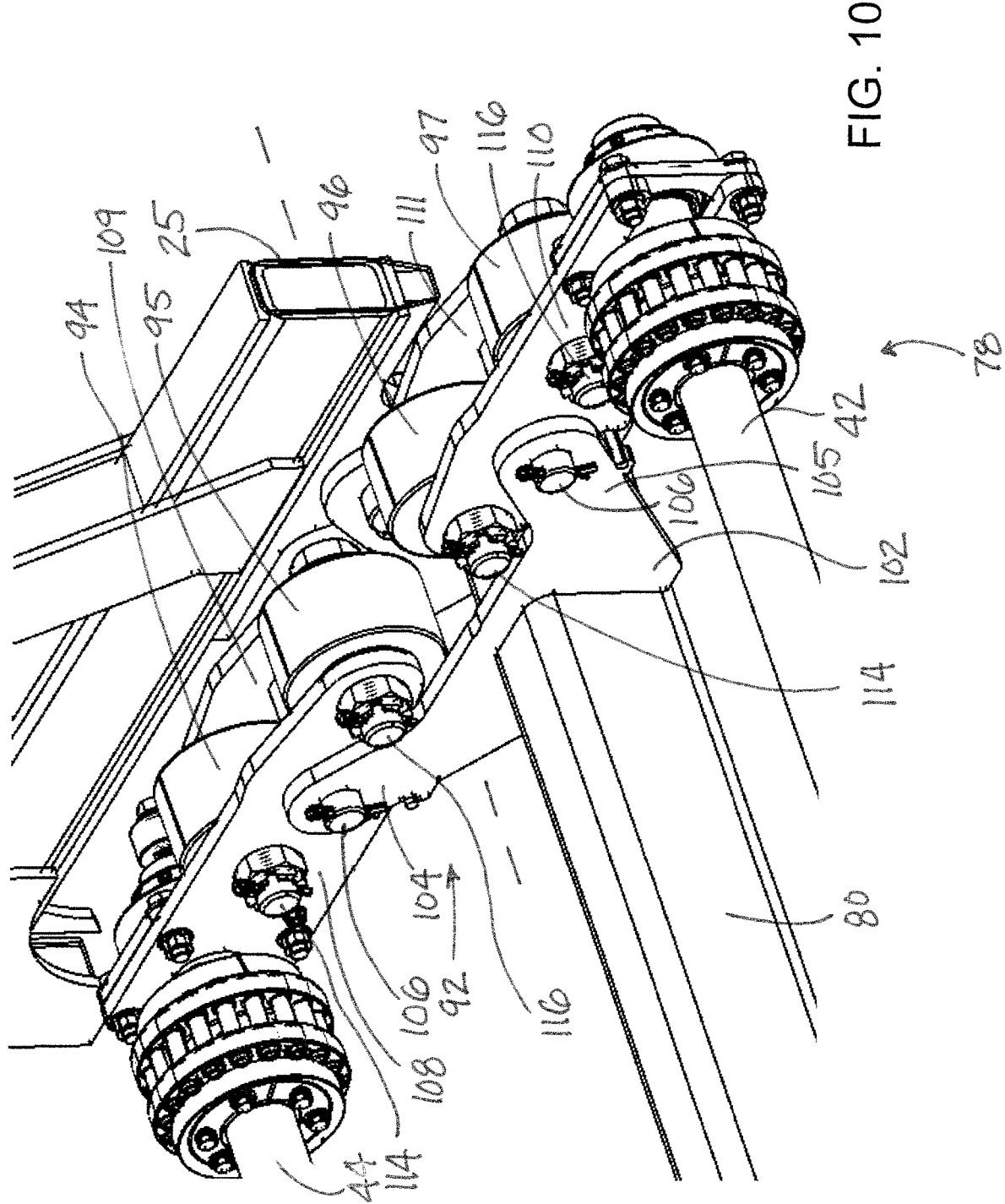
FIG. 10 is a schematic enlarged perspective view of a portion of the optional telescoping conveyor support and drive apparatus shown in FIG. 9, according to an illustrative embodiment.
Figure 11:
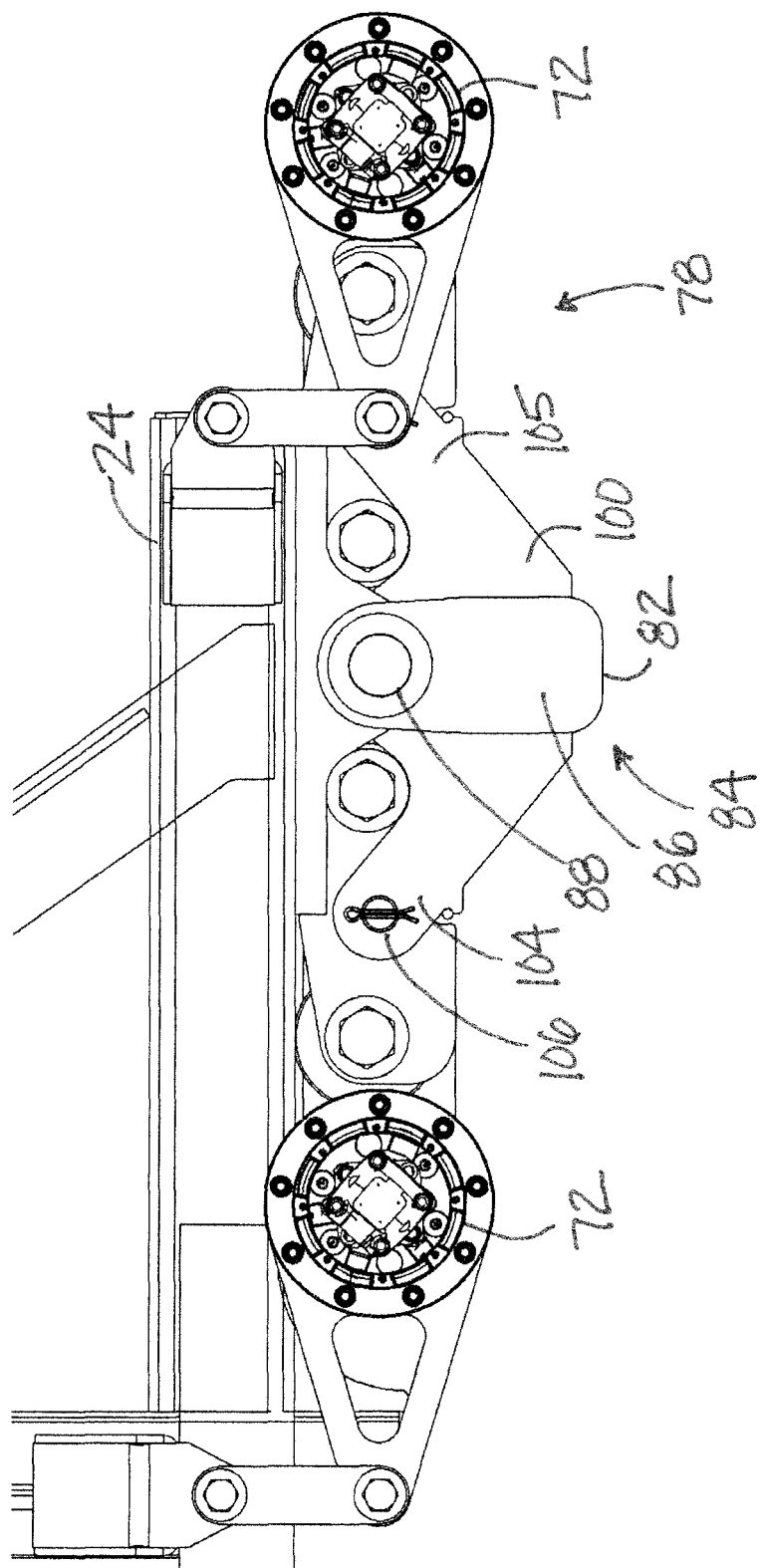
FIG. 11 is a schematic side view of the optional telescoping conveyor support and drive apparatus shown in FIG. 9, according to an illustrative embodiment.
Figure 12:
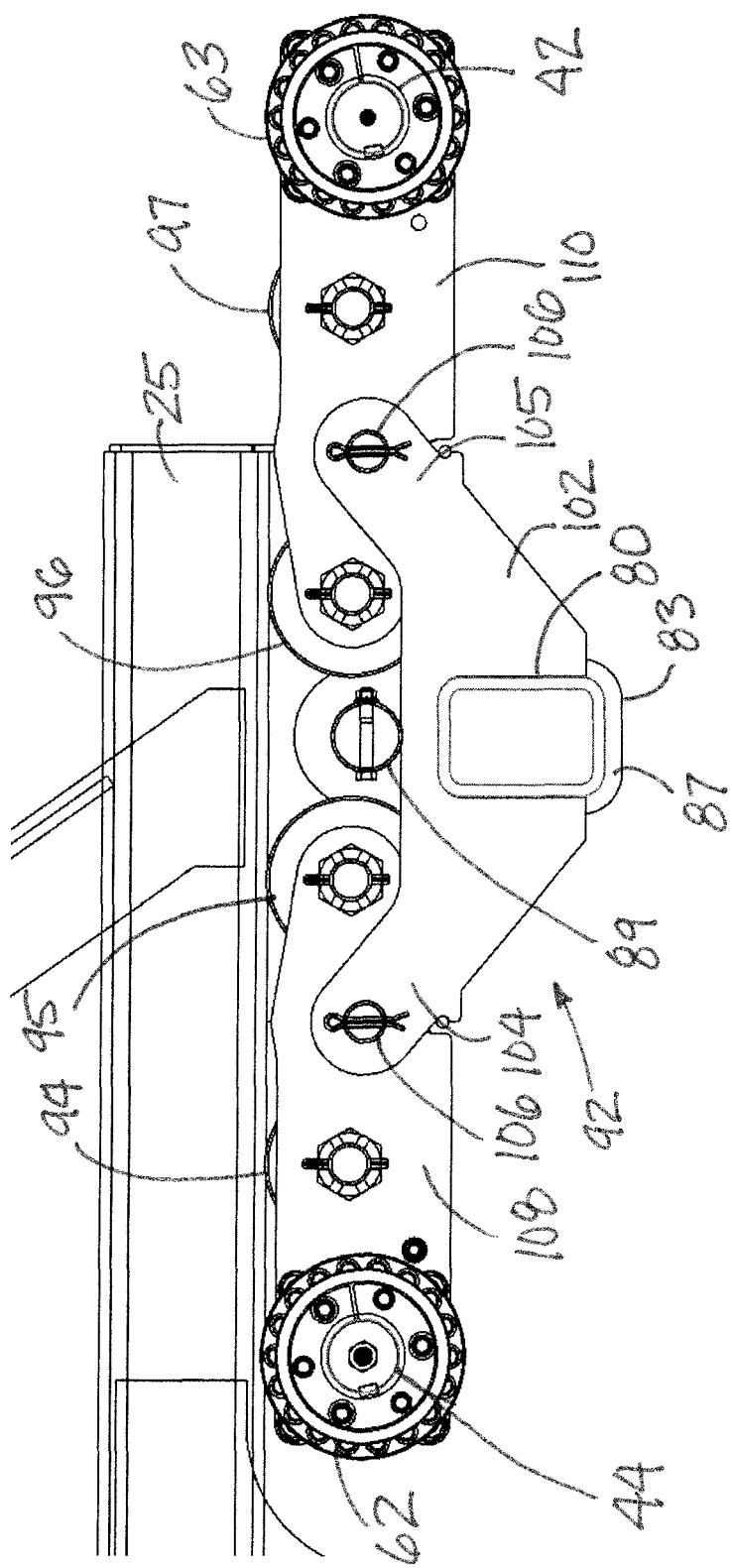
FIG. 12 is a schematic side sectional view of the optional telescoping conveyor support and drive apparatus taken along line 12-12 of FIG. 9, according to an illustrative embodiment

With reference now to the drawings, and in particular to FIGS. 1 through 12 thereof, a new telescoping conveyor drive system embodying the principles and concepts of the disclosed subject matter will be described.

Extendable conveyor systems have been utilized, for example, to place granular or crushed materials in distributed locations to maximize the amount of material in a stockpile as well as minimize material segregation. The extendable conveyor systems typically include a section of the conveyor belt and supporting structure that is relatively stationary, and a section of the conveyor belt and supporting structure that is movable with respect to the stationary portion.

Various systems have been employed to move the movable portion of the conveyor with respect to the stationary portion of the conveyor. A common approach involves the use of a system of cables that pull the movable portion of the conveyor outwardly from the stationary portion of the conveyor. The cable or cables may be positioned on a system of pulleys that guide the cable with respect to the portions of the conveyor system. A significant drawback of the cable system is that the cable is subject to wear, and can break and fail, which releases the movable portion of the conveyor and can allow the movable portion to freely fall and retract into the stationary portion unless some emergency braking system is employed. Further, the cables stretch over time and as a result have significant maintenance requirements.

Some highly e effective approaches are disclosed in U.S. Pat. Nos. 7,448,486 and 7,784,597, each of which is assigned to the same assignee as this application and each of which is hereby incorporated by reference in its entirety. However, it is believed that some of the complexity of even these systems can be avoided to produce an even more reliable system.

In one aspect, this disclosure relates to a system 10 which may include an extendable conveyor apparatus 12. While in the present disclosure the system 10 will be described in the context of an extendable conveyor apparatus 12, it should be recognized that the applications of the system 10 are not necessarily so limited, and those skilled in the art will recognize that the system 10 may be employed, for example, on other apparatus with elements that extend and retract with respect to each other, whether in a telescopic relationship or otherwise. Illustratively, the system 10 could be employed on an extendable crane or lift.

The extendable conveyor apparatus 12 may include a stationary conveyor section 14 which may form a main frame and a movable conveyor section 16 which may be in a telescopic relationship with the stationary conveyor section and is sometimes referred to as a "stinger" frame. The conveyor apparatus may be portable between locations, and the use of the terminology "stationary" conveyor section is not intended to indicate that this section of the conveyor cannot be moved from location to location, or moved up and down, or moved in a lateral sweep left and right, but to simply indicate that the conveyor section 14 remains generally stationary relative to the ground and the conveyor section 16 moves relative to the conveyor section 14 when the conveyor 12 is extended or retracted. Each of the conveyor sections 14, 16 has a longitudinal direction and a lateral direction oriented substantially perpendicular to the longitudinal direction.

The movable conveyor section 16 may be extendable and retractable with respect to the stationary conveyor section 14, and in some embodiments the movable conveyor section is telescopically received or nested in the stationary conveyor section, although the system 10 is not necessarily limited to such an arrangement. At least one of the sections 14, 16 may be formed of a box truss or space frame to receive the other section in the nested relationship. Optionally, the conveyor sections may be formed of a more solid or continuous structure than a truss. In the illustrative embodiments, the stationary conveyor section may be formed of a substantially hollow space frame and the movable conveyor section may be movable inside of the frame of the stationary conveyor section.

In greater detail, the stationary conveyor section 14 may have an inboard end 18 and an outboard end 19, and the longitudinal direction of the stationary conveyor section may extend between the inboard and outboard ends. The stationary conveyor section may comprise a lower support extent 20 and an upper support extent 22, and each of these extents may be formed by portions of a box truss. The lower support extent may further include a pair of lower support members 24, 25 which may comprise elements of the truss structure extending along the "corners" of the cross section of the box truss. The lower support members may extend along at least a portion of the length of the stationary conveyor section, and the members may be laterally spaced from each other to the sides of the conveyor section. The movable conveyor section 16 may have a first end 26, or tail end, which is nested in the stationary conveyor section and a second end 27, or head end, which is movable outwardly from the stationary conveyor section and may be retractable into the stationary conveyor section. The longitudinal direction of the movable conveyor section may extend between the first 26 and second 27 ends of the section. The movable conveyor section may have a length defined in the longitudinal direction between the first and second ends. The movable conveyor section may include a lower extent 28, and the lower extent may include a pair of lower members 30, 32. The lower members may be elements of the truss structure that form the movable conveyor section, and the lower members may extend along at least a portion of the length of the movable conveyor section. The lower members may each have a lower surface 34.

Each of the conveyor sections may include a conveyor belt 36 which is mounted in a conventional manner on each of the respective conveyor sections so that the material placed upon the conveyor belt of the stationary conveyor section moves with the belt from the inboard end of the stationary conveyor section to the outboard end. The material may fall from the conveyor belt at the outboard end on to the conveyor belt mounted on the movable conveyor section. The material may fall onto the belt of the movable conveyor sections toward the first end of the movable conveyor section, and then move along the length of the movable conveyor section to fall off of the second end of the movable conveyor section to the ground surface or a receptacle.

At least one support roller 40 may be mounted on the stationary conveyor section in a manner that permits rotation of the support roller. The apparatus may include a plurality of the support rollers, and may include a first pair of support rollers 40, 41, which may be spaced from each other in the longitudinal direction of the stationary conveyor section, and a second pair 43 of support rollers may be located on an opposite lateral side of the stationary conveyor section. The second pair 43 of support rollers may be located on the stationary conveyor section at a lateral spacing from the first pair of support rollers that generally corresponds to the spacing of the lower surface 34 of the lower members 30, 32 of the movable conveyor section. The support rollers may be mounted toward the outboard end of the stationary conveyor section and may be positioned so that the movable conveyor section rests on and is supported by the support rollers. The movable conveyor section may roll on the support rollers when the movable conveyor sections extended or retracted with respect to the stationary conveyor section.

At least one support axle 42 may be provided on the stationary conveyor section 14 to support the roller or rollers. The support axle 42 may be rotatable with respect to the stationary conveyor section to permit rotation of the axle about an axis of rotation. The support axle 42 may extend substantially perpendicular to the longitudinal axis of the stationary conveyor section in the lateral direction of the conveyor section 14. In some embodiments, a pair of the support axles may be employed which includes a first support axle 42 and a second support axle 44 with the support rollers being mounted on both the first 42 and second 44 support axles. The axles 42, 44 may be spaced from each other in the longitudinal direction of the stationary conveyor section. A pair of the rollers may be mounted on each of the axles, and the rollers may be laterally spaced from each other on the axles. In some embodiments, suitable bearings or bushings may be employed to mount the rollers on the axles to facilitate rotation of the rollers with respect to the axles.

A pair of support elements 46, 47 may support the support axle or axles on the conveyor section 14. The support elements may be mounted on the conveyor section 14 in laterally spaced locations with respect to each other with the axle or axles extending between the elements. The pair of support axles 46, 47 may be mounted on the support elements with the axles extending in a generally lateral direction of the conveyor section, and the rollers may be positioned between the support elements. Each of the support elements may be pivotally mounted or supported on the stationary conveyor section by a pivot mount 48 to permit a degree of rotation by the support elements about a lateral axis with respect to the lower support members 24, 25 of the lower support extent of the stationary conveyor section. The lower members 30, 32 of the lower extent 28 of the movable conveyor section 16 may thus rest on the support rollers 41, 42 with the pivot mount 48 permitting movement of the support elements 46, 47 to facilitate contact between the rollers and the lower surfaces 34 of the lower members. The configuration of the support elements is sometimes referred to as a "walking beam" arrangement and helps to distribute the supported weight more evenly between the support rollers 41, 42. One or more linking members 50 may extend between and be mounted on the lower support members 24, 25 of the stationary conveyor section.

The system 10 may further include a telescoping conveyor drive apparatus 52 which functions to move the movable conveyor section 16 with respect to the stationary conveyor section between the retracted and extended positions. In some embodiments, elements of the conveyor drive apparatus may be located on the movable and the stationary conveyor sections. The conveyor drive apparatus 52 may include a movement assembly 54 which is configured to move or drive the movable conveyor section with respect to the stationary conveyor section in a generally longitudinal direction of the conveyor sections. The movement assembly 54 may include a plurality of teeth 56 which are mounted on the movable conveyor section, and the plurality of teeth may be located in at least one of array 58 of teeth which are arranged in a linear arrangement along a portion of the length of the movable conveyor section. Illustratively, a pair of arrays 58 of teeth may be used, and optionally additional arrays may be utilized. In some highly suitable embodiments, the plurality of teeth 58 may be arranged in a pair of arrays of teeth 58, 59 with each of the arrays being positioned along one of the lower members 30, 32 of the lower extent of the movable conveyor section. The arrays 58, 59 may be laterally spaced and extend along axes that are oriented substantially parallel to the longitudinal axis of the movable conveyor section, and substantially parallel to each other. The arrays 58, 59 may be mounted on the lower extent of the movable conveyor section, and in some embodiments may be mounted on one of the lower members of the lower extent, and may extend in a substantially downward direction from the movable conveyor section.

The teeth of each array may be spaced from each other in the longitudinal direction of the movable conveyor section. The arrays of teeth may extend along at least approximately 50% of the length of the movable conveyor section, and in some embodiments the arrays may extend along at least approximately 75% of the length of the conveyor section, although other lengths may be employed.

The movement assembly 54 may also include a teeth engaging apparatus 60 for engaging and moving the plurality of teeth on the movable conveyor section with respect to the stationary conveyor section. The teeth engaging apparatus 60 may be mounted on the stationary conveyor section and be positioned toward the outboard end of the stationary conveyor section.

The teeth engaging apparatus 60 may comprise a pair of teeth engaging apparatus 60, 61 which are laterally spaced from each other such that each of the teeth engaging apparatus is generally aligned with one of the arrays 58, 59 of teeth. The pair of teeth engaging apparatus 60, 61 may be positioned between the pair of support rollers on a drive shaft 55 which extends in a lateral direction which may be substantially perpendicular to the longitudinal extent of the stationary conveyor section 14. In some embodiments, the drive shaft 55 may extend between the structures supporting the first and second pairs of rollers located toward the opposite lateral sides of the stationary conveyor section 14. In some embodiments, the drive shaft 55 is mounted on the innermost support elements 46 supporting the respective pairs of support rollers, and suitable bushings are bearings may be mounted on the support elements 46 to permit the drive shaft 55 to rotate with respect to the support elements. The drive shaft 55 may effectively connect the respective innermost support elements 46 such that the elements 46, as well as support elements 47 and the support rollers mounted thereon pivot as a unit with respect to the lower support extent of the stationary conveyor section.

In some embodiments, each of the teeth engaging apparatus 60 may include a pin gear 62, 63 mounted on the drive shaft 55 such that the teeth engaging apparatus includes a pair of the pin gears 62, 63. The pair of pin gears may be laterally spaced from each other on the drive shaft in alignment with the arrays of teeth. In one illustrative embodiment, each pin gear 62, 63 comprises a plurality of pins 64 which are positioned at radially spaced locations from the drive shaft and may be arranged at circumferentially spaced positions about the support axle. The pins may thus be positioned in a circular arrangement centered about the drive shaft. The plurality of pins may extend substantially parallel to the axis of rotation of the drive shaft.

The teeth engaging apparatus may include a pair of support discs 66, 67 may be mounted on the drive shaft to rotate with the drive shaft and support the pins 64. The support discs may be spaced from each other in a longitudinal direction of the drive shaft with the pins extending between and being mounted on the support discs. Illustratively, the pins may comprise fasteners which are threaded through corresponding holes of the support discs. In other embodiments, each pin gear may be formed by one or more chains of chain links which are circled or wrapped about the drive shaft in a circular configuration and in a position aligned with the arrays of teeth.

The movement assembly 54 may also include a drive system 70 which is configured to rotate the drive shaft to thereby rotate one or more pin gears and effectively move the teeth of the arrays in either a retraction direction or an extension direction. The drive system 70 may include a motor 72 which is linked to the drive shaft and may act directly on the drive shaft or indirectly through a series of gears linked to the shaft 55. As used in this description, the motor 72 may include additional components including, for example, a gearbox with gear suitable for adjusting the speed of rotation of the shaft 55 with respect to the motor shaft. Additionally, the motor 72 as used in this description may also include a braking device capable of resisting or stopping rotation of the shaft 55 when movement of the movable conveyor section is desired. Further, suitable structure may be utilized in the mounting of the motor 72 on the frame which resists or prevents rotation of the motor and gearbox with respect to the supporting structure, such as a backstop or torque arm which links the motor (or the gearbox of the motor) to the frame.

It is noted that although the illustrative embodiments utilize downwardly extending teeth, it is possible that the teeth may extend in other orientations, such as, for example, laterally outwardly or inwardly from the lower extent of the movable conveyor section. The downward orientation of the teeth does take advantage of the weight of the movable conveyor section to press the teeth into engagement with the pin gear in a manner that may not be the case when the teeth are otherwise oriented.

It will also be recognized that while the illustrative embodiment has a movement assembly mounted on the stationary conveyor section and the arrays of teeth mounted on the movable conveyor section, the plurality of teeth could be mounted on the stationary conveyor section and the movement assembly could be mounted on the movable conveyor section.

Other variations of the system 10 may be employed on conveyor systems in which multiple conveyor sections are movable with respect to a stationary conveyor section, such as when two conveyor sections are movable from one end of the stationary conveyor section, and when a movable conveyor section is movable from each end of the stationary conveyor section.

Some variations of the system 10 may provide variation to the supportive interface between the stationary conveyor section 14 and the movable conveyor section 16 that results in greater strength, and an illustrative example of such a variation is depicted in FIGS. 9 through 12 of the drawings. As shown in these figures, a telescoping conveyor support apparatus 78 may be located on the stationary conveyor section 14 to support at least a portion of the movable conveyor section 16, and the conveyor support apparatus 78 may be located at the outboard end 19 of the stationary conveyor section. The conveyor support apparatus may include a transverse support beam 80 which extends transverse to the longitudinal direction of the stationary conveyor section 14, and the beam 80 may be movably mounted on the stationary conveyor section toward the outboard end 19 in a manner that permits adjustment of the orientation of the beam to facilitate and maximize supportive contact between the support apparatus 78 and the movable conveyor section. The transverse support beam 80 may have opposite lateral ends 82, 83 with each lateral end being mounted on one of the lower support members 24, 25 of the conveyor section 14. The conveyor support apparatus 78 may further include a mounting structure 84 located at each of the opposite lateral ends 82, 83 of the transverse support beam, and the mounting structures may movably mount the support beam 84 on the lower support members 24, 25 of the conveyor section 14. Each mounting structure 84 may pivotally mount the transverse support beam on the lower support members. In some embodiments, the mounting structure 84 may include a pair of mounting plates 86, 87 with each mounting plate being located at one of the opposite lateral ends 82, 83 of the transverse support beam. Each of the mounting plates 86, 87 may be mounted on the lower support member by a pivot pin 88, 89. The pivot pins may define a pivot axis 90 about which the transverse beam pivots with respect to the lower support member.

The conveyor support apparatus 78 may also include a support structure 92 which is located toward each of the opposite lateral ends 82, 83 of the support beam 80. Each support structure 92 may be rigidly mounted on the support beam 80 to move with the beam. Each support structure 92 may include at least one support roller which is rotatable with respect to the transverse support beam for supporting the movable conveyor section 16 (e.g., via contact with the lower surface 34 of the lower members 30, 32 of the movable conveyor section) in a movable manner with respect to the stationary conveyor section. Typically, a plurality of support rollers 94, 95, 96, 97 may be utilized with at least one of the plurality of support rollers being located on opposite sides of the pivot axis 90 of the transverse support beam 80. Illustratively, a pair of the support rollers may be located on each opposite side of the pivot axis 90 of the support beam 80. The support structure 92 may further include a pair of primary support plates 100, 102 which are configured to support the support roller or rollers on the transverse support beam. The pair of primary support plates 100, 102 may be spaced in the lateral direction of the stationary conveyor section 14. The pair of primary support plates may include a laterally-outer primary support plate 100 and a laterally-inner primary support plate 102. Illustratively, the laterally-outer primary support plate 100 may be mounted on or united with one of the mounting plates 86, 87 of the mounting structure. In some embodiments, each of the primary support plates 100, 102 may include a pair of support ears 104, 105 and each of the support ears may extend in substantially opposite directions from the transverse support beam 80 and may be positioned on opposite sides of the pivot axis 90 of the transverse support beam which may effectively form a dual walking beam arrangement for supporting the rollers. Each of the support ears 104, 105 may extend laterally with respect to a longitudinal length of the transverse support beam and one of the support ears of the laterally-outer primary support plate 100 may be positioned in alignment with a support ear of the laterally-inner primary support plate 102. In some embodiments, each of the support ears 104, 105 may have an aperture formed therein and a support pin 106 may extend between each of the apertures in the support ears of the laterally-outer 100 and laterally-inner 102 primary support plates so that a pair of the support pins 106 extend between the primary support plates 100, 102.

Each support structure 92 may also include secondary support plates mounted on the primary support plates 100, 102 to carry the support roller or rollers 94, 95, 96 and 97. The secondary support plates may be mounted on the primary support plates by the respective support pins 106 to permit pivot movement of the secondary support plates with respect to the primary support plates and the transverse support beam. The secondary support plates may include a pair of sets of the secondary support plates, with each set of secondary support plates being positioned between a pair of the support ears of the primary support plates located on the same side of the support beam 80. More specifically, each set of secondary support plates may include a laterally-inner secondary roller support plate 108, 110 located laterally inwardly with respect to the lateral direction of the stationary conveyor section 14, and a laterally-outer secondary support plate 109, 111 located laterally outwardly with respect to the lateral direction of the stationary conveyor section. Each pair of secondary support plates may support one or more support rollers, and typically a pair of the support rollers is positioned between the laterally-inner and the laterally-outer secondary support plates. The support rollers of the respective pair of secondary support plates may be located on opposite sides of the support pin 106. Each of the support rollers may be mounted on the secondary support plates by a roller axle 114, 116 which extends between the laterally-inner and laterally-outer secondary support plates. Each roller axle 114, 116 may extend through a roller aperture formed in each of the secondary support plates.

In some embodiments, elements of the movement assembly 54 may be supported on the conveyor support apparatus 78. Illustratively, the laterally-inner secondary support plates 108, 110 may each be configured to support at least one of the support axles 42, 45 and the pin gears 62, 63 each supported on the respective support axle. The support axle may extend between the laterally-inner secondary support plates 108, 110 of the support structures on opposite lateral ends 82, 83 of the transverse support beam 80. Further, the laterally-inner secondary support plates 108, 110 may be configured to support the motor 72 of the drive system 70 of the conveyor drive apparatus 52 to rotate the respective support axle.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An extendable conveyor system comprising:
    a stationary conveyor section and a movable conveyor section each having a longitudinal direction and a lateral direction oriented substantially perpendicular to the longitudinal direction, the conveyor sections having a conveyor belt, the movable conveyor section being extendable and retractable with respect to the stationary conveyor section; and
    a telescoping conveyor drive apparatus comprising:
        a movement assembly configured to move the movable conveyor section with respect to the stationary conveyor section in the longitudinal direction of the conveyor sections, the movement assembly including:
            a plurality of teeth mounted on a first one of the conveyor sections, the plurality of teeth including at least one array of teeth being arranged in a linear arrangement along a portion of the length of the movable conveyor section;
            a teeth engaging apparatus mounted on a second one of the conveyor sections and being configured to engage and move the plurality of teeth on the first conveyor section to move the movable conveyor section with respect to the stationary conveyor section, the teeth engaging apparatus including a pin gear mounted on the second conveyor section to rotate about a rotation axis, the pin gear including a plurality of substantially cylindrical pins positioned at radially spaced locations from the axis of rotation and being arranged at circumferentially spaced positions about the axis of rotation, the plurality of pins being oriented substantially parallel to the axis of rotation axis; and
        a drive system configured to rotate the pin gear to thereby move the plurality of teeth and the first conveyor section in the longitudinal direction.

2. The system of claim 1 wherein the teeth engaging apparatus includes a pair of support discs, the plurality of pins being mounted on the support discs, the support discs being spaced from each other in a longitudinal direction of the rotation axis with the pins extending between the support discs.

3. The system of claim 1 wherein the plurality of teeth of the movement assembly includes a pair of arrays of teeth and the teeth engaging apparatus of the movement assembly includes a pair of the pin gears.

4. The system of claim 1 wherein the plurality of teeth are mounted on the movable conveyor section and the teeth engaging apparatus is mounted on the stationary conveyor section and being positioned toward the outboard end of the stationary conveyor section.

5. The system of claim 4 wherein at least one support roller is mounted on the stationary conveyor section in a manner that permits rotation of the support roller about the rotation axis, the support rollers being positioned so that the movable conveyor section rests on and is supported by the at least one support roller.

6. The system of claim 5 wherein at least one drive shaft is mounted on the stationary conveyor section in a manner that permits rotation of the drive shaft about the axis of rotation, the pin gear being mounted on the drive shaft.

7. The system of claim 6 wherein a pair of support elements support the drive shaft with the drive shaft extending between the support elements, and a pivot mount mounting each of the support elements on the stationary conveyor section to permit the support elements and the drive shaft mounted thereon to move with respect to the stationary conveyor section to facilitate contact between the rollers and the movable conveyor section.

8. The system of claim 7 wherein a linking member extends between and is mounted on the pair of support elements to cause the support elements to pivot with respect to the lower support extent of the stationary conveyor section as a unit.

9. The system of claim 7 wherein the at least one support roller comprises a plurality of the support rollers, the rollers being spaced from each other in the lateral direction of the stationary conveyor section; and
wherein the at least one support axle comprises a pair of support axles including a first support axle and a second support axle, the rollers being mounted on the first support axle and the second support axle, the axles being spaced from each other in the longitudinal direction of the stationary conveyor section.

10. The system of claim 6 wherein the drive system comprises a motor linked to the drive shaft to rotate the drive shaft and the pin gear mounted on the drive shaft.

11. The system of claim 3 wherein the pair of pin gears are mounted on a drive shaft, and
wherein the drive system comprises a motor linked to the drive shaft to rotate the drive shaft and the pin gear mounted on the drive shaft.

12. The system of claim 1 wherein the telescoping conveyor drive apparatus additionally comprises a conveyor support apparatus configured to support the movable conveyor section on the stationary conveyor section.

13. The system of claim 12 wherein the teeth engaging apparatus of the movement assembly of the conveyor drive apparatus is supported on the conveyor support apparatus.

14. The system of claim 12 wherein the conveyor support apparatus includes a transverse support beam mounted on the stationary conveyor section and has at least one roller supported on the transverse support beam toward each lateral and of the support beam, at least one support plate supporting the at least one roller and elements of the teeth engaging apparatus of the movement assembly of the conveyor drive apparatus.

15. An extendable conveyor system comprising:
a stationary conveyor section and a movable conveyor section each having a longitudinal direction and a lateral direction oriented substantially perpendicular to the longitudinal direction, the conveyor sections having a conveyor belt, the movable conveyor section being extendable and retractable with respect to the stationary conveyor section; and
a telescoping conveyor drive apparatus comprising:
a movement assembly configured to move the movable conveyor section with respect to the stationary conveyor section in the longitudinal direction of the conveyor sections, the movement assembly including:
a plurality of teeth mounted on a first one of the conveyor sections, the plurality of teeth including at least one array of teeth being arranged in a linear arrangement along a portion of the length of the movable conveyor section;
a teeth engaging apparatus mounted on a second one of the conveyor sections and being configured to engage and move the plurality of teeth on the first conveyor section to move the movable conveyor section with respect to the stationary conveyor section;
wherein the teeth engaging apparatus includes a pin gear mounted on the second conveyor section to rotate about a rotation axis, the pin gear including a plurality of pins positioned at radially spaced locations from the axis of rotation and being arranged at circumferentially spaced positions about the axis of rotation, the plurality of pins being oriented substantially parallel to the axis of rotation axis; and
a drive system configured to rotate the pin gear to thereby move the plurality of teeth and the first conveyor section in the longitudinal direction;
wherein the plurality of teeth are mounted on the movable conveyor section and the teeth engaging apparatus is mounted on the stationary conveyor section and being positioned toward the outboard end of the stationary conveyor section;
wherein at least one support roller is mounted on the stationary conveyor section in a manner that permits rotation of the support roller about the rotation axis, the support rollers being positioned so that the movable conveyor section rests on and is supported by the at least one support roller;
wherein at least one drive shaft is mounted on the stationary conveyor section in a manner that permits rotation of the rive shaft about the axis of rotation, the pin gear being mounted on the drive shaft; and
wherein a pair of support elements support the drive shaft with the drive shaft extending between the support elements, and a pivot mount mounting each of the support elements on the stationary conveyor section to permit the support elements and the drive shaft mounted thereon to move with respect to the stationary conveyor section to facilitate contact between the rollers and the movable conveyor section.

16. The system of claim 15 wherein a linking member extends between and is mounted on the pair of support elements to cause the support elements to pivot with respect to the lower support extent of the stationary conveyor section as a unit.

17. The system of claim 15 wherein the at least one support roller comprises a plurality of the support rollers, the rollers being spaced from each other in the lateral direction of the stationary conveyor section; and
wherein the at least one support axle comprises a pair of support axles including a first support axle and a second support axle, the rollers being mounted on the first support axle and the second support axle, the axles being spaced from each other in the longitudinal direction of the stationary conveyor section.

* * * * *